3,060,088
ANTHELMINTIC COMPOSITIONS AND METHOD OF USING SAME

Philip Arthur Kingsbury, Berkhamsted, and Roy Vivian Foster, Tring, England, assignors to Cooper, McDougall & Robertson Limited, Berkhamsted, England, a British company
No Drawing. Filed Nov. 7, 1960, Ser. No. 67,495
Claims priority, application Great Britain Nov. 20, 1959
8 Claims. (Cl. 167—53)

The present invention relates to compositions having anthelmintic activity and to the manufacture thereof.

It has been found that a composition containing one or more ammonium cations of Formula I in the form of one or more salts and a relatively small proportion of an ester of Formula II has a greater than additive effect against infestations of Trichostrongylus spp., in particular *T. colubriformis* and *T. vitrinus*, in sheep.

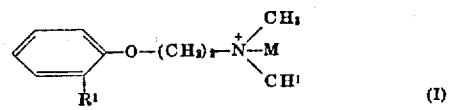

In Formula I:

$R^1$ is a hydrogen or halogen atom or a methyl, ethyl, methoxy, methylmercapto, formyl, acetyl, cyano, nitro or nitroso group when M is a benzyl group optionally substituted in the ortho position with a halogen atom or a methyl, ethyl, methoxy, methylmercapto, nitro or nitroso; or $R^1$ is a hydrogen or halogen atom or a methyl or nitro group when M is a thenyl group.

The anion associated with the cation of Formula I may be any therapeutically acceptable anion.

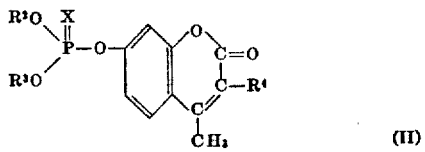

In Formula II:

$R^2$ and $R^3$ are the same or different and each is an alkyl group such as a methyl, ethyl or isopropyl group;
X is an oxygen or sulphur atom; and
$R^4$ is a hydrogen or halogen atom.

The "relatively small proportion" of an ester of Formula II in a dose is preferably not greater than the minimum toxic dose level to the host; that is, between 7.0 mg. and 25.0 mg. for sheep, depending on the particular ester and the mode and frequency of administration. The phrase "greater than additive effect" is to be understood as meaning that the effect of the simultaneous administration to an animal of the components of the said composition at a specified dose level is greater than the sum of the effects of each of the components at the respective specified dose levels when administered separately to separate animals; and therefore the therapeutic index of the composition is greater than that of each of the active components.

Preferably the composition contains by weight 100 parts of one or more cations of Formula I in the form of one or more salts and 0.05 to 25.0 parts of one or more esters of Formula II, and in particular 1.0 to 10.0 parts of one or more esters of Formula II. The preferred cations of Formula I are those in which $R^1$ is a hydrogen atom and M is the benzyl or thenyl group. The preferred salts of the cation of Formula I are the chloride, bromide, iodide, citrate, p-toluenesulphonate, p-chlorobenzenesulphonate, 2-hydroxy-3-naphthoate and embonate; especially preferred are those which are sparingly soluble in water at 20° C., that is, the p-toluenesulphonate, p-chlorobenzene-sulphonate, 2-hydroxy-3-naphthoate, and embonate, which are known to be less toxic to the host than the more soluble salts. The preferred esters of formula II are those in which $R^2$ and $R^3$ are both ethyl groups, especially 3-chloro-4-methyl-7-oxycoumarin-O,O-diethylthiophosphoric acid ester.

The effective dose range of the composition to be administered to the host depends on a number of variable factors, for example the particular cation of Formula I, the particular salt of the cation of Formula I, the particular ester of Formula II, the parasite to be controlled, the maturity and health of the particular host, and the mode and frequency of administration of the composition. The amount of the cation of Formula I in a dose of the composition is preferably not greater than 1,000 mg./kg., generally not greater than 500 mg./kg., and not less than 20 mg./kg. The amount of an ester of Formula II in a dose of the composition is preferably not greater than 5.0 mg./kg. and not less than 0.5 mg./kg. for administration to sheep. The preferred dose of the composition contains 30 to 250 mg./kg. of a cation of Formula I and 1.0 to 5.0 mg./kg. of an ester of Formula II.

The composition is preferably administered orally in any acceptable preparation containing the composition and an acceptable carrier therefor. Fine powders or granules may contain diluents and dispersing and surface active agents, and may be presented in a draft or drench in water or in a syrup; in capsules or cachets in the dry state or in a non-aqueous suspension, when a suspending agent may be included; in tablets, when binders and lubricants may be included; in a suspension in water or a syrup or an oil, or in a water/oil emulsion, when flavouring, preserving, suspending, thickening and emulsifying agent may be included; or in the food of the host of the nematode. The ganules or the tablets may be coated. The preferred preparation for administration are fine dispersible powders, tablets and emulsions. For administration to sheep, the composition or preparation is preferably administered into the fourth abomasum.

According to the present invention in several aspects, there are provided the compositions containing one or more ammonium cations of Formula I in the form of one or more salts and a relatively small proportion of an ester of Formula II, and animal feeding stuffs containing the composition, and the process for the treatment of nematode infestations which comprises administering to the nematode infested locus the composition.

The composition or the preparations containing the composition and an acceptable carrier therefor may be manufactured by any method comprising respectively the mixing together of the active components of the compositions, and the mixing together of the active components of the composition and an acceptable carrier therefor.

The invention will now be described with reference to the following examples, in which the amounts of the constituents are indicated in parts by weight.

*Example 1*

| | Percent |
|---|---|
| N-benzyl-N,N-dimethyl-N-2-phenoxyethylammonium 2-hydroxy-3-naphthoate | 94.5 |
| 3-chloro-4-methyl-7-oxycoumarin-O,O-diethylthiophosphoric acid ester | 2.5 |
| A wetting and dispersing agent, such as a sodium salt of an alkylarylsulphonic acid | 3.0 |

A fine dispersible powder was prepared by grinding the 2-hydroxy-3-naphthoate, mixing some of the salt with the 3 - chloro - 4 - methyl - 7 - oxycoumarin - O,O - diethylthiophosphoric acid ester and the wetting, dispersing agent, adding the rest of the salt to the mixture, and intimately mixing the resultant mixture.

Example 2

| | Percent |
|---|---|
| N-benzyl-N,N-dimethyl-N-2-phenoxyethylammonium 2-hydroxy-3-naphthoate | 90.1 |
| 3-chloro-4-methyl-7-oxycoumarin-O,O-diethylthiophosphoric acid ester | 2.5 |
| A binding agent, such as starch | 4.6 |
| A dispersing agent, such as sodium bi-carbonate | 1.9 |
| A lubricating agent such as talc | 0.9 |

Tablets of the above composition and weighing 5.0 g. were prepared by intimately mixing the ingredients together, granulating the mixture, and compressing the granules.

Example 3

3 - chloro - 4 - methyl - 7 - oxycoumarin - O,O - diethylthiophosphoric acid ester (1 part) was mixed with a diatomaceous earth known as "Celite 209" (4 parts) in a ball mill. The mixture (3.33 parts) was mixed with a dispersible powder of N-benzyl-N,N-dimethyl-N-2 - phenoxyethylammonium 2 - hydroxy - 3 - naphthoate (96.67 parts).

Example 4

3 - chloro - 4 - methyl - 7 - oxycoumarin - O,O - diethylthiophosphoric acid ester (10 parts) was mixed in a mill with a diatomaceous earth known as "Celite 209" (40 parts). Kaolin (49 parts) and a wetting agent containing a sulphonate and known as "Perminal BX" (1 part) were added, and the whole thoroughly mixed. This wettable powder (1.8 parts) was then mixed with a dispersible powder of N-benzyl-N,N-dimethyl-N-2-phenoxyethylammonium 2-hydroxy-3-naphthoate (10 parts).

Example 5

Similar preparations to those described in Examples 1, 2, 3 and 4 were made using relative proportions of N - benzyl - N,N - dimethyl - N - 2 - phenoxyethylammonium chloride, bromide, citrate, p-toluenesulphonate, p-chlorobenzenesulphonate or embonate instead of the 2-hydroxy-3-naphthoate. With the more soluble salts, relatively less of the wetting and dispersing agent was required.

Example 6

Similar preparations to those described in Examples 1, 2, 3 and 4 were made using relative proportions of N,N - dimethyl - N - 2 - phenoxyethyl - N - 2' - thenylammonium p-chlorobenzenesulphonate, N-benzyl-N,N-dimethyl-N-2-o-methylphenoxyethylammonium iodide or embonate, N - o - chlorobenzyl - N,N - dimethyl - N - 2-o-methylphenoxyethylammonium iodide or embonate or 4:4'-diaminostilbene-2:2'-disulphonate, N-o-chlorobenzyl - N,N - dimethyl - N - 2 - o - chlorophenoxyethylammonium p-chlorobenzenesulphonate, or N-o-methylbenzyl - N,N - dimethyl - N - 2 - o - methylphenoxyethylammonium chloride or p-toluenesulphonate instead of the N - benzyl - N,N - dimethyl - N - 2 - phenoxyethylammonium 2-hydroxy-3-naphthoate.

Example 7

Similar preparations to those described in Examples 1, 2, 3 and 4 were made using 3-chloro-4-methyl- or 4-methyl-7-oxycoumarin-O,O-diethylphosphoric acid ester instead of the 3-chloro-4-methyl-7-oxycoumarin-O,O-diethylthiophosphoric acid ester.

Example 8

Compositions were made by mixing the following components, the amount of each component being specified respectively as the amount in mg./kg. administered to the host.

(a) N - benzyl - N,N - dimethyl - N - 2 - phenoxyethylammonium 2-hydroxy-3-naphthoate and 3-chloro-4 - methyl - 7 - oxycoumarin - O,O - diethylthiophosphoric acid-ester:

| | | | |
|---|---|---|---|
| (i) | 134 and 6.2 | (xvi) | 35 and 2.5 |
| (ii) | 67 and 6.2 | (xvii) | 140 and 2.0 |
| (iii) | 33 and 6.2 | (xviii) | 70 and 2.0 |
| (iv) | 187 and 6.0 | (xix) | 35 and 2.0 |
| (v) | 250 and 5.8 | (xx) | 17.5 and 2.0 |
| (vi) | 134 and 4.6 | (xxi) | 187 and 1.5 |
| (vii) | 67 and 4.6 | (xxii) | 140 and 1.25 |
| (viii) | 187 and 4.5 | (xxiii) | 70 and 1.25 |
| (ix) | 250 and 4.3 | (xxiv) | 35 and 1.25 |
| (x) | 134 and 3.1 | (xxv) | 140 and 1.0 |
| (xi) | 187 and 3.0 | (xxvi) | 70 and 1.0 |
| (xii) | 250 and 2.9 | (xxvii) | 35 and 1.0 |
| (xiii) | 140 and 2.5 | (xxviii) | 140 and 0.625 |
| (xiv) | 100 and 2.5 | (xxix) | 70 and 0.625 |
| (xv) | 70 and 2.5 | | |

(b) N-benzyl-N,N-dimethyl-N-2 - phenoxyethylammonium p-toluenesulphonate and 3-chloro-4-methyl-7-oxycoumarin-O,O-diethylthiophosphoric acid ester:

(i) 140 and 2.5
(ii) 70 and 2.5
(iii) 35 and 2.5

(c) N-benzyl-N,N-dimethyl-N-2 - phenoxyethylammonium chloride, bromide, citrate, p-chlorobenzenesulphonate or embonate and 3-chloro-4-methyl-7-oxycoumarin-O,O-diethylthiophosphoric acid ester:

140 and 2.5

(d) N-benzyl-N,N-dimethyl-N-2 - phenoxyethylammonium 2-hydroxy-3-naphthoate and 3-chloro-4-methyl-7-oxycoumarin-O,O-diethylphosphoric acid ester:

(i) 140 and 2.5
(ii) 70 and 2.5
(iii) 140 and 2.0

(e) N-benzyl-N,N-dimethyl-N-2 - phenoxyethylammonium 2-hydroxy-3-naphthoate and 3-bromo-4-methyl-7-oxycoumarin-O,O-diethylthiophosphoric acid ester:

140 and 5

Example 9

N-benzyl-N,N-dimethyl-N-2 - phenoxyethylammonium citrate and N-o-methylbenzyl-N,N-dimethyl-N-2-o-methylphenoxyethylammonium p-toluenesulphonate were prepared from respectively the ammonium chloride and iodide by double decomposition, and had melting points of respectively 126 to 131° C. and 157 to 162° C.

We claim:

1. A composition containing a therapeutically acceptable salt of a cation of the formula:

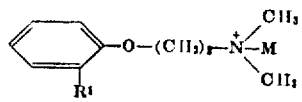

wherein M is selected from the class consisting of a thenyl group and a benzyl group containing an ortho substituent selected from the class consisting of hydrogen, halogen and the methyl, ethyl, methoxy, methylmercapto, nitro and nitroso groups and (1) wherein $R^1$ is selected from the class consisting of hydrogen, halogen, the methyl and nitro groups, when M is a thenyl group and (2) wherein $R^1$ is selected from the class consisting of hydrogen, halogen, the methyl, ethyl, methoxy, methylmercapto, formyl, acetyl, cyano, nitro and nitroso groups, when M is a benzyl group; and a relatively small proportion of an ester of the formula:

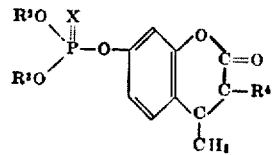

wherein $R^2$ and $R^3$ are each a lower alkyl group, X is selected from the class consisting of oxygen and sulphur atoms, and $R^4$ is selected from the class consisting of hydrogen and halogen atoms.

2. A composition as claimed in claim 1 wherein there are 100 parts of the defined cation in the form of a therapeutically acceptable salt, and 0.05 to 25.0 parts of the defined ester.

3. A composition as claimed in claim 1 wherein the ester has both $R^2$ and $R^3$ as ethyl groups.

4. A composition as claimed in claim 1 wherein the ester is 3-chloro-4-methyl-7-oxycoumarin-O,O-diethyl-thiophosphoric acid ester.

5. A composition as claimed in claim 1 wherein the cation is the N-benzyl-N,N-dimethyl-N-2-phenoxyethyl-ammonium cation.

6. A composition as claimed in claim 1 wherein the cation is the N,N-dimethyl-N-2-phenoxyethyl-N-2'-thenyl-ammonium cation.

7. An animal feeding stuff containing a composition as claimed in claim 1.

8. A process for the treatment of nematode infestations which comprises administering to the host of the nematode infested locus a composition as claimed in claim 1.

References Cited in the file of this patent

UNITED STATES PATENTS 2,918,401     Copp ------------------ Dec. 22, 1959

OTHER REFERENCES

Herlich: Chem. Abst., vol. 52, 1958, page 14978b.
Sollmann: A Manual of Pharmacology, 8th ed., 1957, page 221, Saunders Co., Phila., Pa.

UNITED STATES PATENT OFFICE
CERTIFICATE OF CORRECTION

Patent No. 3,060,088            October 23, 1962

Philip Arthur Kingsbury et al.

It is hereby certified that error appears in the above numbered patent requiring correction and that the said Letters Patent should read as corrected below.

Column 1, lines 20 to 24, the formula should appear as shown below instead of as in the patent:

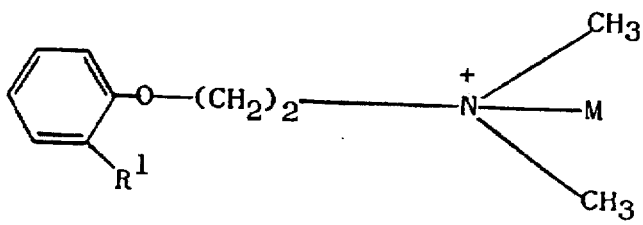

Signed and sealed this 19th day of March 1963.

(SEAL)
Attest:

ESTON G. JOHNSON

DAVID L. LADD
Commissioner of
Patents